(12) United States Patent
Vichniakov et al.

(10) Patent No.: US 10,661,507 B2
(45) Date of Patent: May 26, 2020

(54) ASSEMBLY HAVING INDIVIDUAL COMPONENTS MADE OF A FIBRE-REINFORCED COMPOSITE MATERIAL

(71) Applicant: Airbus Operations GmbH, Hamburg (DE)

(72) Inventors: Alexei Vichniakov, Hamburg (DE); Mohamed-Mourad Sayeh, Hamburg (DE); Tassilo Witte, Hamburg (DE); Thomas Hoffmeister, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1004 days.

(21) Appl. No.: 14/879,422

(22) Filed: Oct. 9, 2015

(65) Prior Publication Data

US 2016/0107742 A1    Apr. 21, 2016

(30) Foreign Application Priority Data

Oct. 21, 2014    (DE) .................. 10 2014 221 356

(51) Int. Cl.
*B64C 1/06*    (2006.01)
*B29C 65/50*    (2006.01)
(Continued)

(52) U.S. Cl.
CPC ........ *B29C 65/5042* (2013.01); *B29C 65/483* (2013.01); *B29C 65/488* (2013.01); *B29C 65/4885* (2013.01); *B29C 65/5014* (2013.01); *B29C 66/00145* (2013.01); *B29C 66/1122* (2013.01); *B29C 66/43441* (2013.01); *B29C 66/524* (2013.01); *B29C 66/532* (2013.01);

*B29C 66/61* (2013.01); *B29C 66/721* (2013.01); *B29C 66/73751* (2013.01); *B29C 66/73755* (2013.01); *B29C 66/81455* (2013.01); *B64C 1/064* (2013.01); *B64C 1/12* (2013.01);
(Continued)

(58) Field of Classification Search
CPC ................................ Y10T 156/1034
See application file for complete search history.

(56) References Cited

U.S. PATENT DOCUMENTS

| 4,532,275 A * | 7/1985 | Aito ................ C08J 5/04 |
| | | 428/299.7 |
| 2008/0128430 A1* | 6/2008 | Kovach ............. B32B 27/00 |
| | | 220/586 |

(Continued)

FOREIGN PATENT DOCUMENTS

| CN | 100418850 C | 9/2008 |
| DE | 10148950 A1 | 4/2003 |

(Continued)

OTHER PUBLICATIONS

German Patent Office, German Search Report for European Patent Application No. 10 2014 221 356.8 dated Jun. 3, 2015.

*Primary Examiner* — Ian A Rummel
(74) *Attorney, Agent, or Firm* — Lorenz & Kopf LLP

(57) ABSTRACT

An assembly, configured in particular in the form of an aircraft assembly, comprises a plurality of individual components composed of a fibre-reinforced composite material. An edge section of at least one individual component is sealed by means of a sealing tape which contains reinforcing fibres and a curable plastics material.

4 Claims, 4 Drawing Sheets

(51) Int. Cl.
*B29C 65/00* (2006.01)
*B29C 65/48* (2006.01)
*B64C 1/12* (2006.01)
*B29L 31/30* (2006.01)
*B64C 1/00* (2006.01)

(52) U.S. Cl.
CPC .......... *B29C 66/71* (2013.01); *B29C 66/7212* (2013.01); *B29C 66/72141* (2013.01); *B29C 66/72143* (2013.01); *B29L 2031/3082* (2013.01); *B64C 2001/0072* (2013.01); *Y02T 50/43* (2013.01)

(56) References Cited

U.S. PATENT DOCUMENTS

| | | | |
|---|---|---|---|
| 2011/0135887 A1* | 6/2011 | Saff | B32B 3/06 428/192 |
| 2014/0079903 A1 | 3/2014 | Hugon et al. | |

FOREIGN PATENT DOCUMENTS

| | | |
|---|---|---|
| DE | 102005034621 B3 | 1/2007 |
| DE | 102007062111 A1 | 7/2009 |
| DE | 102010018518 A1 | 10/2011 |
| DE | 102004001078 B4 | 2/2013 |
| WO | 2015020675 A1 | 2/2015 |

* cited by examiner

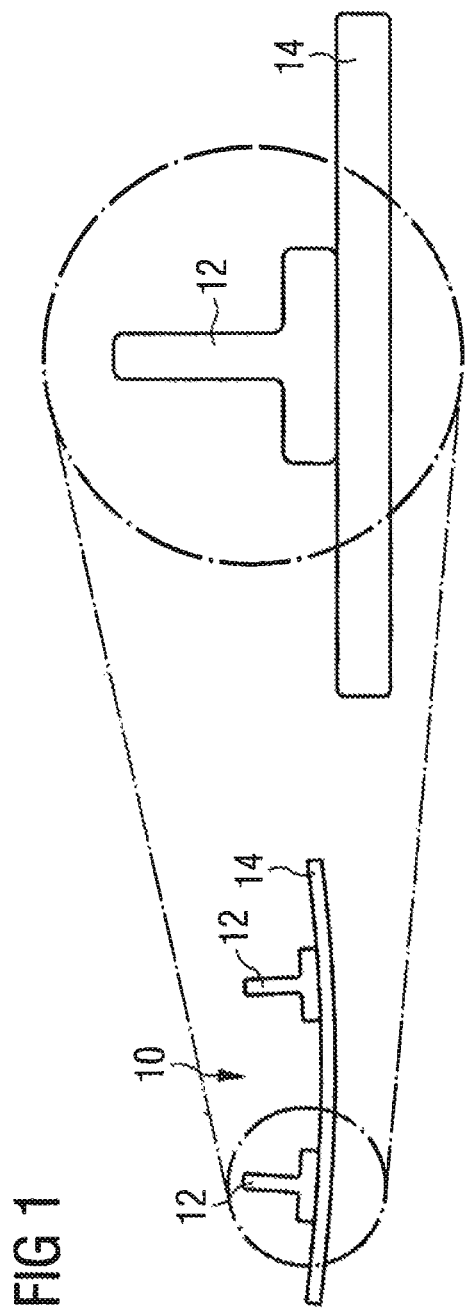

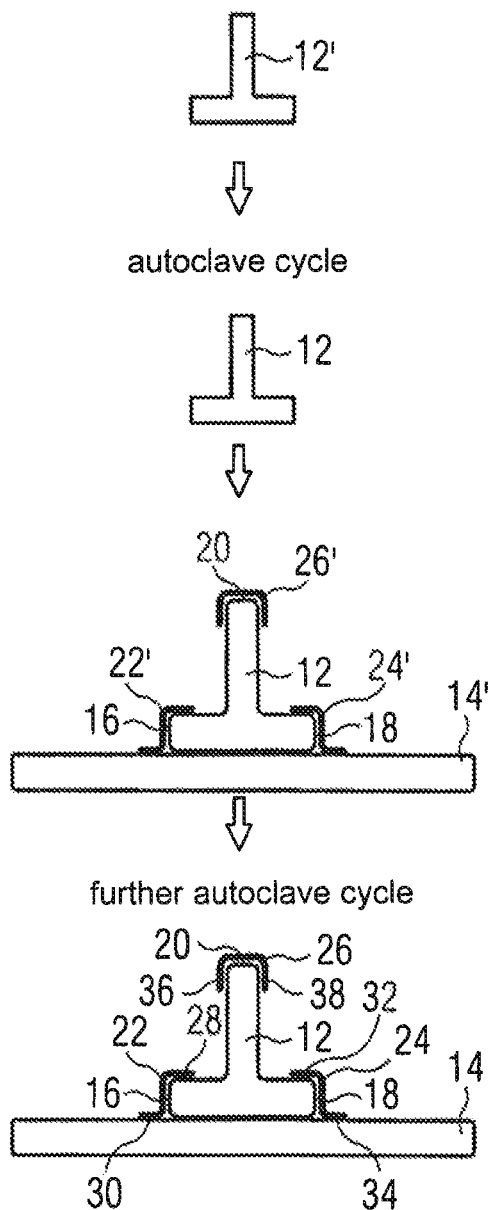

ASSEMBLY HAVING INDIVIDUAL COMPONENTS MADE OF A FIBRE-REINFORCED COMPOSITE MATERIAL

CROSS-REFERENCE TO RELATED APPLICATION

The application claims priority to German Patent Application No. 1 02014 221 356.8 filed Oct. 21, 2014, which is incorporated herein by reference in its entirety.

BACKGROUND

The embodiments relate to an assembly, in particular an aircraft assembly, comprising a plurality of individual components composed of a fibre-reinforced composite material. Furthermore, the embodiment relates to a method for producing such an assembly. In aircraft construction, efforts are being made to use increasingly components which are composed wholly or partly of fibre-reinforced composite materials, for example glass fibre- or carbon fibre-reinforced plastics. For example, DE 10 2007 062 111 A1 describes a transverse support structure which is composed of carbon fibre-reinforced plastic and serves to support the individual panels of an aircraft floor system for separating a passenger cabin from a cargo compartment arranged below the passenger cabin. Furthermore, it is known, for example from DE 10 2004 001 078 B4 or CN 100418850, to produce aircraft fuselage segments, which comprise an aircraft outer skin section and reinforcing elements (e.g. frames, stringers), from fibre-reinforced composite materials.

In the production of aircraft components from fibre-reinforced composite materials, a multilayer laminate is firstly built up from fibre prepregs. The fibre prepregs may comprise a woven fabric or laid fabric of reinforcing fibres provided with a surface layer made of a curable plastics material. The laminate may be built up manually or in an automated manner, supporting and holder structures frequently being required in particular in the production of components of complex shapes, in order to bring the components into the desired shape. The plastics material deposited on the surfaces of the fibres is finally cured in an autoclave cycle under pressure and/or elevated temperature, so that a composite material with a matrix made of cured plastic and reinforcing fibres embedded in the matrix is obtained.

In the production of aircraft fuselage segments described in DE 10 2004 001 078 B4 or CN 100418850, a reinforcing-element semifinished product composed of a fibre prepreg may be brought into the desired shape and subsequently, as described above, subjected to an autoclave cycle in order to cure the plastics material contained in the reinforcing-element semifinished product. The reinforcing element may then be placed onto an aircraft outer skin section semifinished product likewise composed of a fibre prepreg and, by curing the plastics material contained in the aircraft outer skin section semifinished product, in a further autoclave cycle, connected to the aircraft outer skin section semifinished product or the aircraft outer skin section resulting from the semifinished product. Finally, in a separate process step, exposed edges of the reinforcing element which have been produced for example by machining during the shaping, such as e.g. a milling or grinding process, must be sealed. For this purpose, a sealing resin in liquid form is applied to the edges and subsequently cured. In the cured state, the sealing resin protects the assembly from environmental influences, such as e.g. the penetration of moisture and other substances and moreover affords a certain, albeit limited, protection from mechanical impairments.

The embodiments described herein is directed to the object of providing an assembly, in particular an aircraft assembly, comprising a plurality of individual components composed of a fibre-reinforced composite material, which assembly can be produced simply and efficiently and moreover is distinguished by good stability in the region of its edges to be sealed. Furthermore, the embodiment is directed to the object of specifying a method for producing such an assembly.

This object is achieved by an assembly made of a fibre-reinforced composite material as disclosed herein.

An assembly comprises a plurality of individual components composed of a fibre-reinforced composite material. The assembly is in particular an aircraft assembly. For example, the assembly may be provided to form a fuselage segment of an aircraft and comprise an areal, correspondingly curved aircraft outer skin section and at least one reinforcing element, which may be configured for example in the form of a stringer or a frame. The reinforcing fibres contained in the fibre-reinforced composite material used to produce the individual components may, for example, be glass fibres, carbon fibres or other suitable reinforcing fibres. The fibres may be present in the form of continuous fibres, fibre bundles, fibre-laid fabrics or fibre-woven fabrics. In individual-component semifinished products used for producing the individual components, the fibres may be impregnated with a resin or another plastics material which can be cured by input of energy, resulting in a dimensionally stable composite material with a matrix made of the cured plastics material and reinforcing fibres embedded in the matrix.

In the production of the assembly, individual components already containing cured plastics material may be connected to one another. Preferably, however, in the production of the assembly at least one individual-component semifinished product is processed, which contains uncured plastics material and may be configured, for example, in the form of a fibre prepreg. For example, a first individual-component semifinished product may be pretreated in an autoclave, so that a first individual component configured e.g. in the form of a reinforcing element results. This first individual component can then be placed onto a second individual-component semifinished product configured e.g. in the form of an aircraft outer skin section semifinished product and, by curing the uncured plastics material contained in the second individual-component semifinished product, in a further autoclave cycle, connected to the second individual-component semifinished product or the second individual component resulting from the second individual-component semifinished product. Thereby, a reactive connection between a surface of the first and a surface of the second individual component can be produced.

At least one individual component of the assembly comprises an edge section which has been produced, for example, by machining the individual component, such as e.g. by milling. This edge section requires sealing in order to protect the assembly from environmental influences, such as e.g. the penetration of moisture. For example, a first individual component configured in the form of a reinforcing element may comprise at least one such edge section. In the assembly, an edge section of at least one individual component of the assembly is sealed by means of a sealing tape which contains reinforcing fibres and a curable plastics material.

In the production of the assembly, it is therefore no longer necessary to apply a liquid sealing resin to an exposed edge section of an individual component of the assembly which is to be sealed. Rather, the sealing tape in the form of a sealing-tape semifinished product containing the curable plastics material in the uncured state can be applied to the edge section in a comparatively simple manner, whereby the process for producing the assembly can be designed more efficiently. The curable plastics material contained in the sealing-tape semifinished product can then be cured by supplying energy, e.g. in an autoclave. This results in a uniform distribution of the curable plastics material contained in the sealing tape over the edge section to be sealed, whereby the quality of the edge sealing can be improved.

In principle, it is conceivable to apply the sealing-tape semifinished product to an edge section of an individual component of the assembly to be sealed, only when the assembly is otherwise finished, i.e. the assembly no longer comprises any individual-component semifinished products. The curable plastics material contained in the sealing-tape semifinished product then has to be cured in a separate process step. Preferably, however, the sealing-tape semifinished product is applied to an edge section of an individual component of the assembly to be sealed, already at a time at which the assembly still comprises at least one individual-component semifinished product and therefore still has to undergo a heat- and/or pressure-treatment step anyway, in order to cure the plastics material contained in the individual-component semifinished product. The curable plastics material contained in the sealing-tape semifinished product can then be cured simultaneously with the curable plastics material contained in the individual-component semifinished product, so that a separate process for curing the plastics material contained in the sealing-tape semifinished product can be dispensed with.

A further advantage of the assembly arises from the fact that the sealing tape contains, besides curable plastics material, reinforcing fibres and thereby protects the edge section sealed by means of the sealing tape better from mechanical loads than pure sealing resin. In particular, the use of the sealing tape containing reinforcing fibres increases the damage tolerance of the sealed edge section to collision, impact and shock loads.

The sealing tape preferably contains a curable resin, in particular an epoxy resin. If the curable plastics material contained in a sealing-tape semifinished product is to be cured simultaneously with a curable plastics material contained in an individual-component semifinished product of the assembly, the sealing-tape semifinished product preferably contains the same curable plastics material as the individual-component semifinished product. This enables optimal control of the curing process for curing the curable plastics material contained in the sealing-tape semifinished product and the individual-component semifinished product.

In a preferred embodiment of the assembly, the sealing tape contains less than 35 vol %, in particular 10 to 30 vol % and particularly preferably 15 to 20 vol % of reinforcing fibres. This ensures that the sealing tape contains a sufficient amount, i.e. a sufficient volume fraction, of curable plastics material. Proper sealing of the edge section, to which the sealing tape is applied, is thereby guaranteed.

At least a proportion of the reinforcing fibres contained in the sealing tape are preferably carbon fibres, in particular short carbon fibres. Additionally or alternatively thereto, the sealing tape may, however, also contain glass fibres or other reinforcing fibres which increase the mechanical strength of the sealing tape. Preferably, the proportion of carbon fibres in the total amount of the reinforcing fibres contained in the sealing tape is 85 to 95 vol %. The carbon fibres may be recycled fibres or new fibres or a mixture of recycled fibres and new fibres.

Furthermore, at least a proportion of the reinforcing fibres contained in the sealing tape can be composed of a thermoplastic plastics material. In particular, the sealing tape can contain polyamide fibres. Preferably, the proportion of the reinforcing fibres of a thermoplastic plastics material contained in the sealing tape is 5 to 15 vol % of the total fibre content. Fibres composed of a thermoplastic plastics material, in particular polyamide, increase the fracture toughness of the sealing tape and thus contribute to further improvement of the damage tolerance of the sealing tape, in particular in the case of collision, impact and shock loads.

In a preferred embodiment of the assembly, the sealing tape extends over the edge section to be sealed and over at least one surface section, adjacent to the edge section to be sealed, of at least one of the two individual components. A secure fastening of the sealing tape in the region of the edge section to be sealed is thereby ensured. Furthermore, "sharp" edges present in the region of the edge section are smoothed or rounded by the sealing tape. It is thereby possible to minimise the risk of a vacuum film, which is wound around the assembly, for example during an autoclave process for curing a curable plastics material contained in an individual-component semifinished product and/or a sealing-tape semifinished product, being damaged by a "sharp" edge of an edge section to be sealed. Finally, by using a sealing tape which extends over the edge section to be sealed and over at least one surface section, adjacent to the edge section to be sealed, of at least one of the two individual components, the peeling stress resistance of the connection between two individual components of the assembly in the region of the edge section to be sealed is increased.

In one embodiment of the assembly, the sealing tape may extend over an edge section, to be sealed, of a first individual component, a surface section, adjacent to the edge section to be sealed, of the first individual component and a surface section, adjacent to the edge section to be sealed, of a second individual component. In such a configuration of the assembly, the sealing tape or the sealing-tape semifinished product is preferably positioned over the edge section to be sealed and the corresponding adjacent surface sections of the individual components or individual-component semifinished products, only after the connection of the individual components or individual-component semifinished products to one another.

Alternatively or additionally thereto, the assembly may comprise a sealing tape which extends over an edge section, to be sealed, of a first individual component and two surface sections, adjacent to the edge section to be sealed, of the first individual component. For example, the sealing tape may extend over two mutually opposite surface sections of the first individual component which are adjacent to the edge section to be sealed. Such a placement of the sealing tape is suitable, for example, in the region of edge sections of an individual component of the assembly which are situated at a relatively large distance from other individual components of the assembly.

In a particular embodiment of the assembly, a region of the sealing tape extending over a first surface section of the first individual component is arranged between the first surface section of the first individual component and a surface section of the second individual component lying opposite the first surface section. A sealing-tape semifinished product can then be applied in a simple manner to the edge section and the first surface section, adjacent to the edge section, of the first individual component or a first individual-component semifinished product, before the first individual component or the first individual-component semifinished product is connected to the second individual component or a second individual-component semifinished product. As a result, the production of the assembly can be further simplified. In such a case, however, the sealing tape should be thin enough that the dimensions of the assembly are not appreciably affected by the arrangement of the sealing tape between a first surface section of the first individual component and a surface section of the second individual component lying opposite the first surface section. This can be ensured, for example, by the use of a sealing tape, the basis weight of which is 4 to 10 g/m² and the thickness of which corresponds merely to approximately ¹/₁₀ of the thickness of a reinforcing fibre layer in one of the individual components of the assembly.

In a method for producing an assembly, in particular an aircraft assembly, which comprises a plurality of individual components composed of a fibre-reinforced composite material, an edge section of at least one of the two individual components is sealed by means of a sealing tape which contains reinforcing fibres and a curable plastics material.

In the method for producing an assembly, a sealing-tape semifinished product, which contains the curable plastics material in the uncured state, can be applied to the edge section. The curable plastics material contained in the sealing-tape semifinished product can then be cured simultaneously with a curable plastics material which is contained in an individual-component semifinished product and in particular is cured in a step for connecting the individual-component semifinished product to an individual component or a further individual-component semifinished product of the assembly so as to produce a reactive connection between a surface of the first and a surface of the second individual component.

Preferably, the sealing tape contains less than 35 vol %, in particular 10 to 30 vol % and particularly preferably 15 to 20 vol % of reinforcing fibres. Additionally or alternatively thereto, 85 to 95 vol % of the reinforcing fibres contained in the sealing tape may be carbon fibres, in particular short carbon fibres. Additionally or alternatively thereto, 5 to 15 vol % of the reinforcing fibres contained in the sealing tape may be fibres composed of a thermoplastic plastics material, in particular polyamide.

The sealing tape may be applied in such a way that it extends in the finished assembly over the edge section to be sealed and over at least one surface section, adjacent to the edge section to be sealed, of at least one of the two individual components.

The sealing tape may be applied, in particular after the connection of a first individual component or a first individual-component semifinished product to a second individual component or a second individual-component semifinished product, in such a way that it extends in the finished assembly over an edge section, to be sealed, of the first individual component, a surface section, adjacent to the edge section to be sealed, of the first individual component and a surface section, adjacent to the edge section to be sealed, of the second individual component.

The sealing tape may also be applied in such a way that it extends in the finished assembly over an edge section, to be sealed, of a first individual component and two surface sections, adjacent to the edge section to be sealed, of the first individual component.

In particular, before the connection of the first individual component or the first individual-component semifinished product to the second individual component or the second individual-component semifinished product, the sealing tape may be applied in such a way, and the first individual component or the first individual-component semifinished product may be subsequently connected to the second individual component or the second individual-component semifinished product in such a way, that in the finished assembly a region of the sealing tape extending over a first surface section of the first individual component is arranged between the first surface section of the first individual component and a surface section of the second individual component lying opposite the first surface section.

BRIEF DESCRIPTION OF THE DRAWINGS

The various embodiments will hereinafter be described in conjunction with the following drawing figures, wherein like numerals denote like elements, and:

FIG. 1 shows an assembly configured in the form of an aircraft assembly, comprising a plurality of individual components composed of a fibre-reinforced composite material, FIG. 2 shows a first embodiment of a method for producing the assembly according to FIG. 1.

DETAILED DESCRIPTION

Figure 3A:
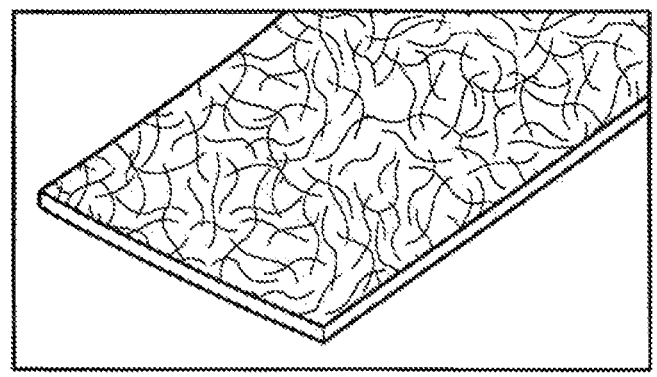
FIG. 3A shows detail representations of a sealing tape used in the assembly according to FIG. 1 for sealing edge sections of a first individual component of the assembly.

The following detailed description is merely exemplary in nature and is not intended to limit the disclosed embodiments or the application and uses thereof. Furthermore, there is no intention to be bound by any theory presented in the preceding background detailed description.

FIG. 1 shows an assembly 10 configured in the form of an aircraft assembly, in particular in the form of an aircraft fuselage segment. The assembly 10 comprises a plurality of first individual components 12. The first individual components 12 are each configured in the form of T-shaped reinforcing elements and connected to a second individual component 14 configured in the form of an area element. As can be seen in FIG. 1, the second individual component 14 configured in the form of an area element has a curved contour and serves to form an aircraft outer skin section of the aircraft fuselage segment. The first individual components 12, by contrast, serve to form primary structure elements, in particular stringers of the aircraft fuselage element.

The individual components 12 and 14 of the assembly 10 are each composed of a fibre-reinforced composite material. In particular, the individual components 12 and 14 contain reinforcing fibres configured in the form of carbon fibres. The reinforcing fibres can be present in the form of short fibres, continuous fibres, fibre-laid fabrics, fibre-woven fabrics or the like. The fibres are embedded in a matrix made of a curable plastics material, in particular a resin. The resin can, for example, be an epoxy resin.

As can be seen from FIG. 2, each of the two individual components 12 and 14 are produced from an individual-component semifinished product 12' and 14'. The individual-component semifinished products 12' and 14' are each composed of a fibre prepreg which contains reinforcing fibre layers impregnated with the curable plastics material. By curing the plastics material contained in the individual-component semifinished products 12' and 14' in the uncured state, for example in an autoclave cycle, the individual-component semifinished products 12' and 14' can be converted into the individual components 12 and 14.

In the embodiment of a method for producing the assembly 10 illustrated in FIG. 2, firstly a first individual-component semifinished product 12' is subjected to an autoclave cycle in order to cure the plastics material contained in the first individual-component semifinished product 12'. Subsequently, a machining of the resulting individual component 12 takes place, for example by milling, in which exposed edge sections 16, 18, and 20 result.

In the next step, the individual component 12 is placed, at a desired position, onto a surface of a second individual-component semifinished product 14' provided for forming the second individual component 14 and still containing uncured plastics material. After the positioning of the first individual component 12 on the surface of the second individual-component semifinished product 14', a respective sealing-tape semifinished product 22', 24', and 26' is applied to the exposed edge sections 16, 18, and 20 of the first individual component 12. Each sealing-tape semifinished product 22', 24', and 26' contains reinforcing fibres and a curable plastics material. In particular, the sealing-tape semifinished products 22', 24', and 26' contain the same curable plastics material as the second individual-component semifinished product 14', namely a resin, for example an epoxy resin.

In a further autoclave cycle, the plastics material contained in the second individual-component semifinished product 14' and the plastics material contained in the sealing-tape semifinished products 22', 24', and 26' are cured. Since the sealing-tape semifinished products 22', 24', and 26' and the second individual-component semifinished product 14' contain the same curable plastics material, the autoclave process can be controlled in a suitable manner to ensure proper curing of the plastics material. By the curing of the plastics material contained in the second individual-component semifinished product 14', a firm reactive connection between the first individual component 12 and the second individual component 14 is produced. Furthermore, by the curing of the plastics material contained in the sealing-tape semifinished products 22', 24', 26', a similar firm, reactive connection between sealing tapes 22, 24, 26, resulting from the sealing-tape semifinished products 22', 24', 26', and the individual components 12 and 14, respectively, is produced. As a result of the further autoclave process, therefore, an assembly 10 distinguished by high mechanical resistance and peeling stress resistance is obtained.

Figure 3B:
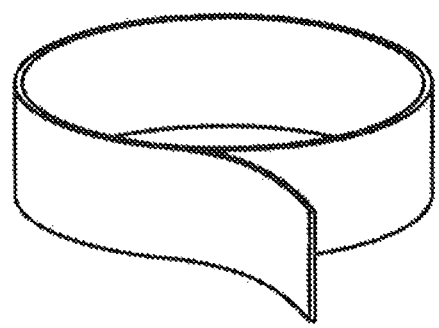
FIG. 3B shows detail representations of a sealing tape used in the assembly according to FIG. 1 for sealing edge sections of a first individual component of the assembly.

FIG. 3A and FIG. 3B show detail representations of a sealing-tape semifinished product present as a continuous tape, from which the sealing-tape semifinished products 22', 24', and 26' can be cut off. The sealing-tape semifinished products 22', 24', and 26' and the sealing tapes 22, 24, and 26 resulting from the curing of the plastics material contained in the sealing-tape semifinished products 22', 24', and 26' contain with 15 to 20 vol % a relatively small proportion of reinforcing fibres, thereby ensuring that a sufficient amount of curable plastics material is present to ensure proper sealing of the respective edge sections 16, 18, and 20.

The reinforcing fibres contained in the sealing-tape semifinished products 22', 24', and 26' and the sealing tapes 22, 24, and 26 are a fibre mixture. In particular, 85 to 95 vol % of the reinforcing fibres are formed as carbon fibres, in particular short carbon fibres. Furthermore, the sealing-tape semifinished products 22', 24', and 26' and the sealing tapes 22, 24, and 26 contain reinforcing fibres made of a thermoplastic plastics material, in particular polyamide. The volume fraction of the reinforcing fibres composed of a thermoplastic plastics material is 5 to 15 vol %.

While the carbon fibres increase the mechanical strength of the sealing tapes 22, 24, and 26, the reinforcing fibres composed of a thermoplastic plastics material increase the fracture toughness of the sealing tapes 22, 24, and 26. The sealing tapes 22, 24, and 26 are thus not only capable of preventing the penetration of moisture and other substances into the assembly 10. Rather, the sealing tapes 22, 24, and 26 protect the edge sections 16, 18, and 20 of the assembly 10 also in a particularly effective manner from mechanical impairments.

Figure 4:
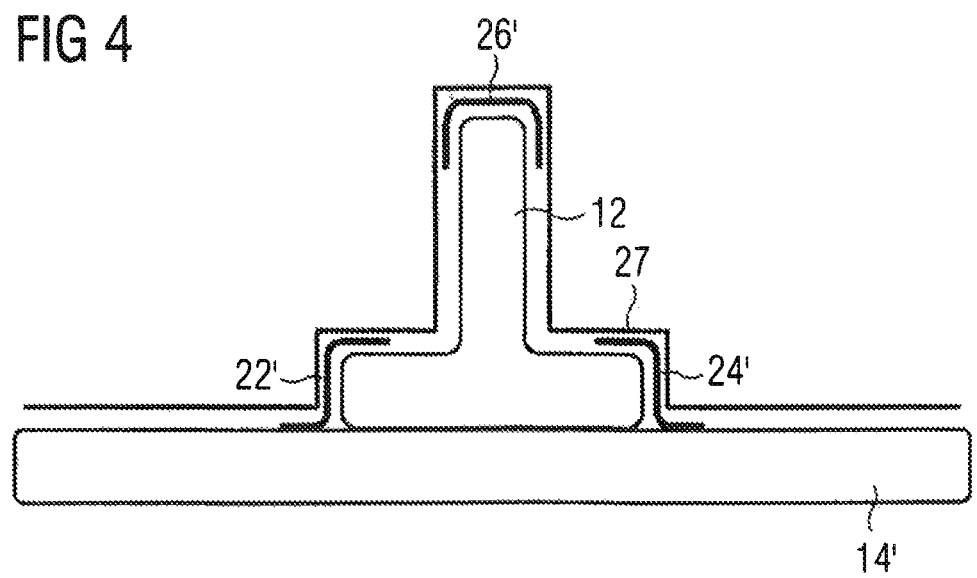
FIG. 4 shows a detail representation of the assembly during an autoclave process carried out in the method according to FIG. 2.

Furthermore, the application of the sealing-tape semifinished products 22', 24', and 26' results in smoothing or rounding of "sharp" edges of the first individual component 12. Damage to a vacuum film 27, illustrated in FIG. 4, which is used in the further autoclave process according to FIG. 2 can thereby be avoided.

As is clear from FIG. 2, each sealing-tape semifinished product 22', 24', and 26' is applied in such a way that the sealing tapes 22, 24, and 26 in the finished assembly extend over the respective edge section 16, 18, and 20, to be sealed, of the first individual component 12 and over at least one surface section 28, 30, 32, 34, 36, and 38, adjacent to the edge section 16, 18, and 20 to be sealed, of the first and of the second individual component 12 and 14, respectively. In particular, the sealing-tape semifinished products 22' and 24' in the method according to FIG. 2 are applied, after the connection of the first individual component 12 to the second individual-component semifinished product 14', in such a way that they extend over the respective edge section 16 and 18 to be sealed, a surface section 28 and 32, adjacent to the edge section 16 and 18 to be sealed, of the first individual component 12 and a surface section 30, 34, adjacent to the edge section 16 and 18 to be sealed, of the second individual-component semifinished product 14'. In contrast thereto, the sealing-tape semifinished product 26' is fastened, either before or after the connection of the first individual component 12 to the second individual-component semifinished product 14', in such a way to the first individual component 12 that it extends over the edge section 20, to be sealed, of the first individual component 12 and two surface sections 36 and 38, adjacent to the edge section 20 to be sealed, of the first individual component 12.

Figure 5:
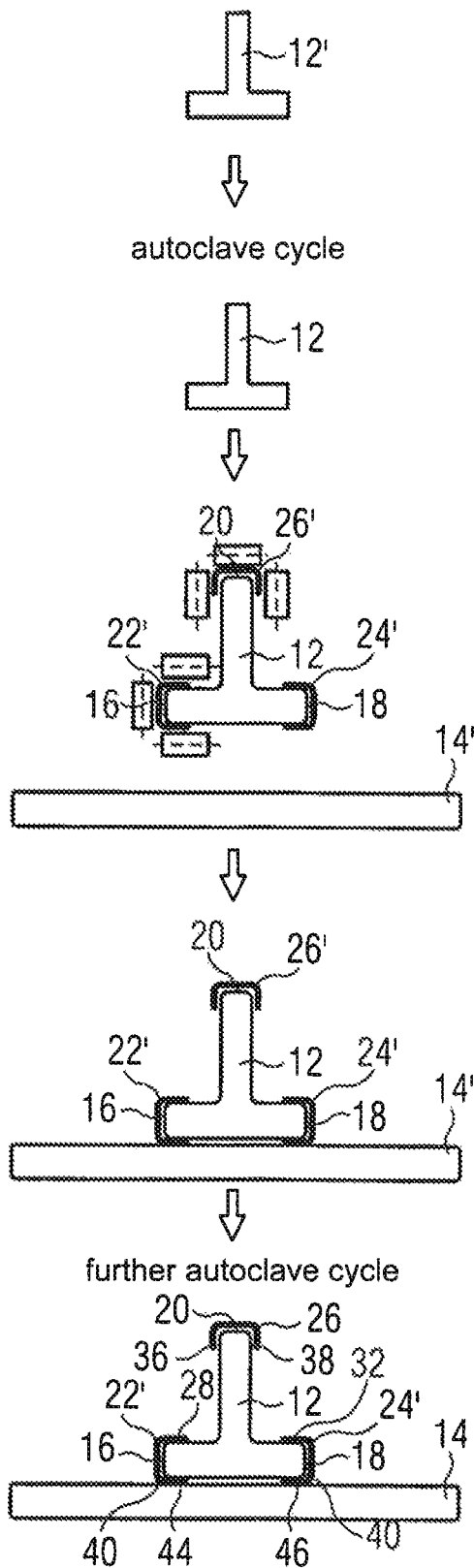
FIG. 5 shows a further embodiment of a method for producing the assembly according to FIG. 1.

The method for producing the assembly 10 shown in FIG. 5 differs from the variant of the method according to FIG. 2 in that all the sealing-tape semifinished products 22', 24', and 26' are connected to the first individual component 12 before the connection of the first individual component 12 to the second individual-component semifinished product 14'. In particular, the sealing-tape semifinished products 22', 24', and 26' are connected, either manually or using an automatic rolling unit, in such a way to the first individual component 12 that each sealing-tape semifinished product 22', 24', and 26' extends over a corresponding edge section 16, 18, and 20 to be sealed and over two surface sections 28, 40, 32, 42, 36, and 38 adjacent to the edge section 16, 18, and 20 to be sealed. After the connection of the first individual component 12 to the second individual-component semifinished product 14' and the carrying-out of the further autoclave process, regions of the sealing-tape semifinished product 22' and 24' extending over first surface sections 40 and 42 of the first individual component 12 are therefore arranged between the first surface sections 40 and 42 of the first individual component 12 and respective surface sections 44 and 46 of the second individual components lying opposite the first surface sections 40 and 42.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An aircraft assembly comprising:
a first component comprising a first fibre-reinforced composite material having reinforcing fibre layers and a curable plastics material, the first component configured as a T-shaped reinforcing element having a base and a leg extending from the base, the base having two edge sections, and the leg having an edge section;
a second component comprising a second fibre-reinforced composite material having reinforcing fibre layers and the curable plastics material; and
sealing tape comprising reinforcing fibres and the curable plastics material;
a first piece of the sealing tape extending over the edge section of the leg, and over two surface sections of the leg, wherein the two surface sections of the leg are adjacent to the edge section of the leg;
a second piece of the sealing tape extending over a first edge section of the base, over a first surface section of the base adjacent to the first edge section of the base, and over a first surface section of the second component adjacent to the first edge section of the base;
a third piece of the sealing tape extending over a second edge section of the base, over a second surface section of the base adjacent to the second edge section of the base, and over a second surface section of the second component adjacent to the second edge section of the base; and
the curable plastics material being cured to seal the edge section of the leg and the two edge sections of the base with the sealing tape, and such that the second and third pieces of the sealing tape connect the first component to the second component.

2. The aircraft assembly according to claim 1, wherein 85 to 95 vol % of the reinforcing fibres contained in the sealing tape are carbon fibres.

3. The aircraft assembly according to claim 1, wherein 5 to 15 vol % of the reinforcing fibres contained in the sealing tape are fibres comprising a thermoplastic plastics material.

4. The aircraft assembly according to claim 1, wherein the sealing tape contains less than 35 vol % of reinforcing fibres.

* * * * *